Geo. Perry's
Mode of Cultivating Grape Vines, Etc

74417

PATENTED
FEB 11 1868

United States Patent Office.

GEORGE PERRY, OF GEORGETOWN, CONNECTICUT.

Letters Patent No. 74,417, dated February 11, 1868.

IMPROVEMENT IN MODE OF CULTIVATING GRAPE-VINES.

The Schedule referred to in these Letters Patent and making part of the same.

TO ALL WHOM IT MAY CONCERN:

Be it known that I, GEORGE PERRY, of Georgetown, in the county of Fairfield, and State of Connecticut, have invented a new and useful Improvement in the Mode of Cultivating Grape-Vines; and I do hereby declare the following to be a full, clear, and exact description of the same, reference being had to the accompanying drawings, in which—

Figure 1:
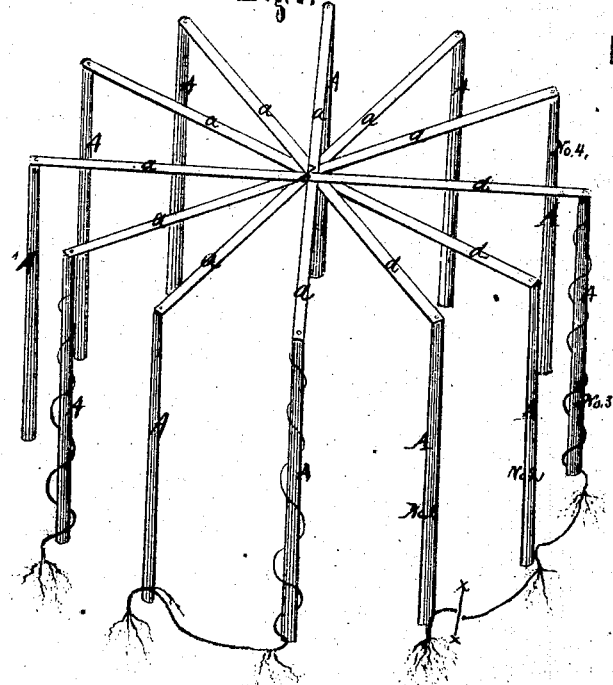

Figure 1 represents a view of my mode of cultivating grape-vines, where the plants are set in a circle.

Figure 2:
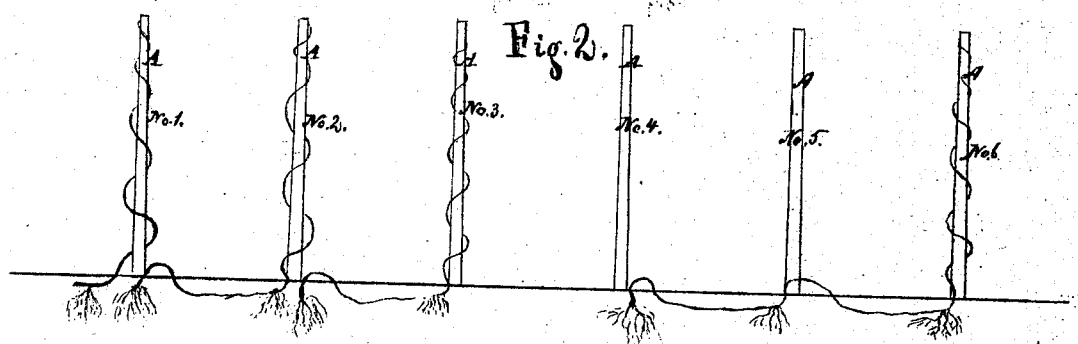

Figure 2, the same, where they are set in straight lines, and

Figure 3:
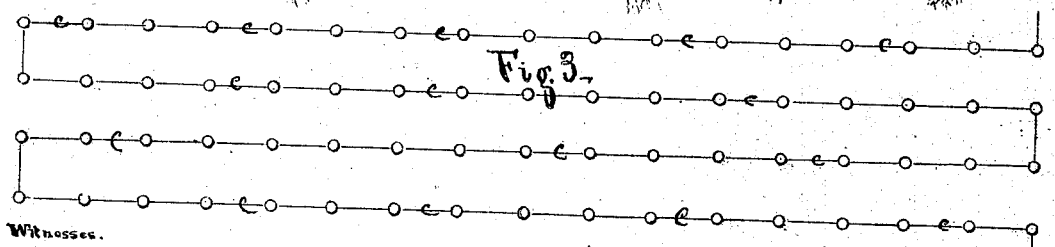

Figure 3 shows how my mode may be applied to the cultivation of vines in a large field.

My invention relates to an improved manner of training and cultivating grape-vines, whereby I secure at all times young and healthy vines, and much of the labor and care now necessary to the successful cultivation of the vine may be dispensed with.

In the ordinary modes of cultivating grape-vines, it is customary to prune the vines each year, cutting off nearly all of the old wood, and thus confining each year's foliage to the new wood, which shoots from the parent stock, near to the root, during that year. The natural and inevitable result of this process is a destruction of the balance, intended and instituted by nature, existing between the roots and wood and foliage growth of the plant. The roots and foliage have each reciprocal functions to perform, both necessary to the perfect health of the plant, and if either be interfered with, it must result in the disarrangement of the other. The fruit of the vine adds nothing to its vigor, but is actually so much extracted therefrom, and it is consequently found that, in cases where the vine has been sacrificed to force the fruit in greater than natural quantity, the roots become relatively too large to be properly reacted upon by the existing quantity of foliage, and the vine becomes diseased, and ceases to bear, or the fruit fails to mature properly, and is subject to mildew, rot, &c. By my system of cultivttion, herein set forth, these evils are obviated by continually preserving new and fresh roots to the plant, constantly in perfect balance with the fruit and foliage, and aged and unhealthy roots are lopped off.

In order that others may understand my mode of training and cultivating the vine, I will proceed to particularly describe it.

The drawings represent a circular plot of ground, about twelve feet in diameter, having twelve posts, A A, &c., placed about three feet apart around its circumference, to each of which a vine is set. The opposite posts are connected and strengthened by the braces $a$ $a$, &c., and at a point over the centre of the plot of ground where they cross one another, they may be fastened by a pin or bolt, $b$, thus rendering the whole very secure.

Beginning with the post marked 1 for convenience, we will describe our mode of operation.

A vine is first set at each post, either in the spring or fall, as deemed best, and is trained to its post, and allowed to grow one year or more, one year being generally sufficient. Then a shallow trench is dug between the posts, around the circle, as represented by the lines $c$ $c$, fig. 3 of the drawings, in which each vine is laid down from its post to the next, where it is trained for another season. The vine at post No. 1 is laid down and covered with soil to the post No. 2, the vine at post No. 2 being treated in the same manner, and trained to post No. 3, and so on around the circle, when each vine will have been trained to a post three feet from its original root. They are allowed to grow in these positions another year or more, when the same operation is gone through with again, and then each vine will be found six feet away from its original root, and the portions covered with earth will be found supplied with new roots throughout the whole space of six feet, thereby greatly increasing the strength and vigor of the plant. After growing another year or more, the vines may be again laid down and trained to the next adjoining post, where the vine originally planted at post No. 1 will be found at post No. 4, and each one around the circle will be found growing at a distance of nine feet from the point at first set out. By this time, the portion laid down (at least nine feet) will have sufficient new roots to support the growing vines, and the original root may be severed at the post where it was set, as indicated in the drawings by the line $x$ $x$, near post No. 1. Thus the growing vine will become free from the old original root, which may have become diseased or partially dead, and have, at all times, comparatively new and fresh roots, as three feet would be formed each season after "layering," and that part of the root which should be four years old or more removed, so that the vines and roots will, in one sense, be always young, more vigorous, and capable of producing fruit, and, at the same time, be better able to resist the attacks of insects, mildew, and rot, which are found to attack old vines more than young ones.

In using this system in a vineyard where the rows are straight, as the plants would extend themselves beyond the row, it would be necessary to take up one each year of "layering," and transfer it to the beginning of the row, or the ends of the rows may be joined together, as illustrated in the drawings at fig. 3, so that it would only be necessary to transfer one each year that the plants were laid down, from the end of the last row to the beginning of the first.

My system of cultivation should not be confounded with any system of propagation by "layering," as heretofore practised. When vines are propagated by layering, the new plants produced are essentially young plants. They do not bear fruit until the new roots have acquired two or three years' growth, while, by my system, there is a constant and regular rejuvenation of the plant, without any suspension of its fruit-bearing capacity. The old roots continue to sustain the new plants until the new roots are capable of taking their place fully, and these, in turn, are replaced by new, fresh roots before they can have become diseased in the manner above stated. This is not the case under any system of cultivation hitherto practised. When new plants are formed by means of layers, the old plant still remains, and the new plant does not take its place, but begins an independent life in another place. By my system, the parent stock becomes the new stock, and while it is removed to another place, another new stock takes its place. There is no propagation of new and independent plants, but a constantly recurring rejuvenation of the old plant.

I do not claim to have discovered any new faculty inherent in the vine, but to have applied, in a new method and for a new purpose, those properties which were known before.

Having thus described my invention, what I claim as new is—

The herein-described mode or system of cultivating vines and removing the oldest roots, so as to preserve a vigorous and healthy growth, with new roots, for an indefinite period of time.

GEORGE PERRY.

Witnesses:
ELI G. BENNETT,
DAVID H. MILLER.